United States Patent
Bourdais

[15] 3,665,016

[45] May 23, 1972

[54] AMINOALKYLTHIO INDOLES

[72] Inventor: Jacques Bourdais, Paris, France

[73] Assignee: Centre National De La Recherche Scientifique, Paris, France

[22] Filed: Oct. 3, 1968

[21] Appl. No.: 764,933

[30] Foreign Application Priority Data

Oct. 5, 1967 France......................................123429
Sept. 26, 1968 France......................................167763

[52] U.S. Cl..................260/268 BC, 260/239 B, 260/239 E, 260/268 PH, 260/268 R, 260/293.61, 260/326.12 R, 424/250, 424/267, 424/274

[51] Int. Cl. ........................................................C07d 51/70

[58] Field of Search.............260/268 BC, 268 PH, 326.12 R, 260/283 S, 293.43

[56] References Cited

UNITED STATES PATENTS 2,921,073  1/1960  Conover..........................260/283 X
3,320,261  5/1967  Lorenz.................................260/283

Primary Examiner—Donald G. Daus
Attorney—Stevens, Davis, Miller & Mosher

[57] ABSTRACT

A class of amino alkyl thioethers of 2-mercapto indole is described together with methods for their manufacture from indoline-2-thione starting materials, reacted with amine or aziridine. The compounds are of therapeutic value as pain relievers, tranquillizers and other purposes.

15 Claims, No Drawings

AMINOALKYLTHIO INDOLES

This invention relates to indole derivatives and to their production. According to the present invention there are provided amino alkyl thioether derivatives of 2-mercapto-indoles which are bases of the formula:

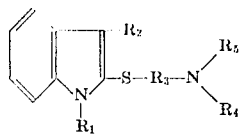

wherein $R_1$ and $R_2$ are the same or different and are each hydrogen or a substituted or unsubstituted alkyl, aralkyl or aryl group and $R_2$ can also represent a cyclopentyl group, $R_3$ is a radical of the formula $C_nH_{2n}$ where n is a integer from 2 to 5 or taken together with $R_4$ and the nitrogen atoms to which they are attached constitutes a 5-, 6- or 7-membered heterocyclic ring linked directly to the sulphur atom or linked to the sulphur atom by a $C_nH_{2n}$ group, $R_4$ and $R_5$ when taken separately are the same or different and are each hydrogen or an alkyl radical and when taken together constitute with the nitrogen atom to which they are attached a 5-, 6- or 7-membered heterocyclic ring containing one or more hetero atoms, and the salts of the said bases.

According to a further feature of the invention there is provided a process for the production of compounds of the foregoing general formula which comprises reacting an indoline 2-thione of the formula

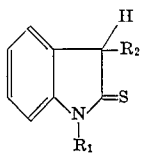

with an amine of the formula

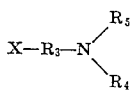

where X is halogen or an ester group and $R_1$ $R_2$ $R_3$ $R_4$ and $R_5$ have the meanings assigned to them above, or in the case where $R_5$ represents a hydrogen atom, reacting a said indokine-2-thione with an aziridine of the formula

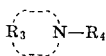

under conditions which give rise to the intermediate formation of an indoline 2-thiolate radical of the formula

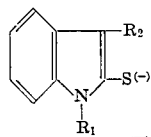

In general, the reaction between the indolene-2-thione and the amine or aziridine, in substantially equivalent proportions, can be carried out in the presence of a diluent, particularly a protic diluent such as water or alcohol or an aprotic diluent such as a aromatic hydrocarbon or even a highly polar diluent such as N,N-dimethyl formamide, dimethyl sulphoxide, sulpholane or hexamethyl phosphoramide or mixtures of these diluents. The reaction can be carried out at 0° to 150° C depending on the particular reactant and diluents used.

The indolene-2-thione and the amine or aziridine may be directly mixed, each in a diluent and if desired in the same diluent. Alternatively the indolene-2-thione, in a diluent, may be previously mixed with a source of alkali metal or alkali earth metal, ions providing a equivalent proportion thereof is made to form an indole 2-thiolate of the said metal, and then mixed with the amine or aziridine. The source of alkali metal ions or alkali earth metal may be, for example, a hydroxide, alcoholate hydride or amide of the said metal.

While the invention is in no way restricted by any theory as to how the reaction proceeds, it is believed that when the idolene-2-thione is brought into contact with the amine or aziridine there is found, from thence an ammonium or aziridinium intermediate salt.

The following Examples will serve to illustrate the invention:

EXAMPLE I 2-(2-amino-ethylthio)-indole

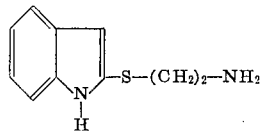

To 7.5 grams (0.05 mole) indoline-2-thione (Sugasawa, J. pharmac, Soc. Japan, 58, 29, (1938), in 40 ml of pure benzene, is added a solution of 2.58 grams (0.06 mole) of aziridine in 20 ml of pure benzene, with agitation, in a current of nitrogen, in a period of 10 minutes. A clear yellow solution is obtained, and the solvent then evaporated under vacuum. The residue is recrystallized in 25 ml of ethylacetate, producing 4.7 g (49 percent yield) of said thio-ether in the form of colorless crystals melting at 128°.

The same compound can be prepared by another method described herein, for example by using 2-bromo-ethylamine.

EXAMPLE II 2-(2-Dimethylamino-ethylthio)-indole

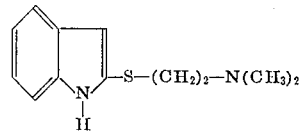

3 grams (0.02 mole) of 2-thione indoline is dissolved in 44 ml of a molar solution of sodium ethylate in anhydrous ethanol, (0.044 mole). 3.17 grams (0.022 mole) of dimethylamino-2 chloroethane hydrochloride is added, and the whole mixture heated to boiling point. After cooling, the sodium chloride is removed by filtration, and the filtrate evaporated, under vacuum: 4.4 grams of the said thioether are obtained, melting at 81°-82°. By recrystallization of this in 10 ml of cyclohexane, 3.7 grams of pure product is obtained (84 percent yield) as colorless crystals, melting at 82°.

EXAMPLE 3

2-(2-Dimethylamino-ethylthio)-indole; and its hydrochloride

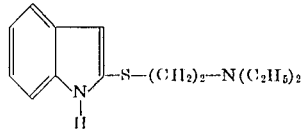

a. As in Example 2, 3 grams of 2-thione indoline is treated successively with 42 ml of molar sodium ethylate solution, and with 3.6 g (0.021 mole) of diethylamino-2 chloroethane hydrochloride 4.9 grams of the desired thioether are obtained, in the form of an oil, which is transformed into the hydrochloride by the addition of hydrochloric acid in an etheral solution, 4.4 gm of the hydrochloride is formed (yield 78 percent) melting at 137°.

By recrystallization in 15 ml of anhydrous isopropanol, 3.0 gms of pure hydrochloride are obtained (53 percent yield) as colorless crystals, melting at 140°.

b. To 6 grams(0.04 mole) of 2-thione indoline in 30 ml of anhydrous isopropanol, is added, a solution of 5.4 grams (0.04 mole) diethylamino-2-chlorethane in 10 ml of isopropanol, with agitation, under a current of nitrogen, at a temperature of 25°, within a period of 5 minutes.

The whole mixture is raised to 40°, for 10 minutes, until the thione indoline has completely disappeared. By adding 100 ml of anhydrous ether to this solution, the thioether hydrochloride is precipitated. 10 grams is collected (i.e. 88 percent); melting point is 135°. By recrystallization in 25 ml of anhydrous isopropanol, 6.6 grams of the pure hydrochloride is obtained (58 percent yield) melting at 140°.

EXAMPLE 4

2-(2-Di-isopropylamino-ethylthio)-indole hydrochloride

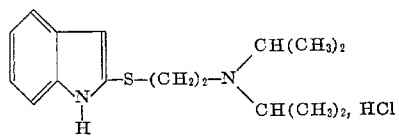

To 7.0 grams (0.04 mole) of thione indoline, in 30 ml of anhydrous isopropanol, is added, within the period of 10 minutes, a solution of 7.8 grams (0.047 mole) of di-isopropylamino-2 chlorethane in 10 ml of isopropanol, with agitation, under a stream of nitrogen, at 25°, the solution obtained is agitated at 25°, for 30 minutes. The desired thioether hydrochloride crystallizes out. After the addition of 200 ml of anhydrous ether, 13.5 grams of the hydrochloride is obtained (92 percent yield) melting at 191°–192°.

By recrystallization in 100 ml of anhydrous ethanol, 10.4 grams of pure hydrochloride is obtained (71 percent yield) melting at 193° colorless crystals).

EXAMPLE 5

2-(2-piperidino-ethylthio)-indole hydrochloride

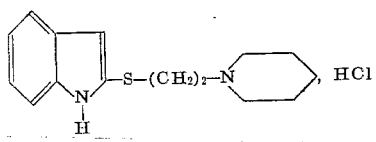

To 6 grams (0.04 mole) of 2-thione indoline in 30 ml of anhydrous isopropanol, is added, within the period of 5 minutes, a solution of 5.9 g (0.04 mole) of N-(chloro-2 ethyl) piperidine in 10 ml of isopropanol, with agitation, under a stream of nitrogen at a temperature of 25°. Agitation continues after the mixture is completely dissolved, at 25°, for 8 hours. A crystalline mass is then produced, from which a precipitate can be separated by the addition of anhydrous ether. 8.9 grams of the desired hydrochloride are produced (75 percent yield); it melts at 171°. By recrystallization in 25 ml anhydrous ethanol, 7.5 grams of hydrochloride is obtained, (63 percent yield) as colorless crystals.

EXAMPLE 6

2-(3-Dimethylaminopropylthio)-indole hydrochloride

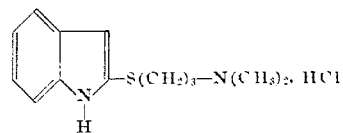

To a solution of 4.5 grams (0.03 mole) of 2 thione indoline in 30 ml of dimethyl formamide, is added in a period of 10 minutes, with agitation, and under nitrogen, at a temperature of 25°, a solution of 3.65 grams (0.03 mole) of N,N-dimethyl chloro-3 propylamine in 15 ml of dimethyl formamide, followed by agitation at 25°, for 2 hours, and then by evaporation of the solvent under vacuum. An oil is obtained which crystallizes on contact with anhydrous ether. Thus 7.4 grams of desired hydrochloride are produced (91 percent yield), melting at 120°. By recrystallization in 20 ml of a mixture of 55 percent ethylacetate and 45 percent anhydrous ethanol, 4.6 grams of the pure hydrochloride are obtained, as colorless crystals melting at 128° (56 percent yield).

EXAMPLE 7

1-Methyl-2-(2-diethylamino-ethylthio)-indole hydrochloride

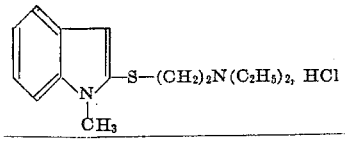

To 1.63 grams (0.01 mole) of 1 methyl 2-thione indole in 20 ml of anhydrous isopropanol, is added 1.36 grams (0.01 mole) of 2-diethylamino chlorethane, and the mixture shaken for 4 hours, at 25°, under a current of nitrogen; After 20 hours rest at 25°, the product is obtained by recrystallization from pure ether, 2.2 grams (74 percent yield) of the desired hydrochloride is produced, said hydrochloride melting at 172°. By recrystallization in 10 ml of anhydrous ethanol, 1.8 grams of the pure hydrochloride is produced as colorless crystals, melting at 175° (60 percent yield).

The 1 methyl 2-thione indoline used in the process of this invention, is prepared in the following way. To a solution of 14.7 grams (0.1 mole) 1 methyl, 2-indoline (Stolle, J.prakt. Chem. 128, 1 (1930)) in 50 ml of anhydrous pyridine, at a temperature of 95°, is added, in the period of 10 minutes, with vigorous agitation, under a current of nitrogen, 5.55 grams (0.025 mole) of powdered phosphorous pentasulphate, and then the solution heated to the above temperature for 20 minutes. The mixture is then poured out, and separates into 2 layers, 400 ml of iced water is added and the mixture then acidified by 50 ml of acetic acid, and the precipitate recovered in chloroform. After drying, the chloroformic layer is evaporated, to give 8.3 grams of coarse 1-methyl-indoline-2-thione, which is recrystallized by reaction with 150 ml of cyclohexane. 6.6 grams of the thione are produced, (i.e. a yield of 40 percent) of slightly yellow needles, melting at 110°.

EXAMPLES 8–10

In like manner, the hydrochlorides of the following thioethers are prepared:

| $R_1$ | $R_2$ | $R_3$ | —N(R_5)(R_4) | M.P. F°. recovery solvent | Yield, percent |
|---|---|---|---|---|---|
| H | H | —(CH$_2$)$_2$— | 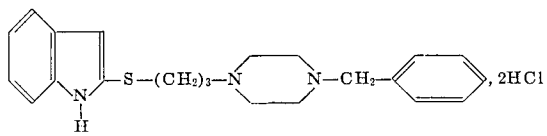, HCl | [1] 115° | 87 |
| H | H | —(CH$_2$)$_2$— | 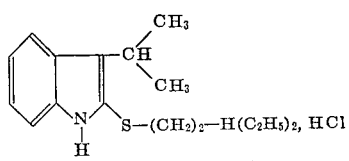N—CH$_3$, 2HCl | [2] 200–203° | 73 |
| H | CH$_3$–CH–CH$_3$ | —(CH$_2$)$_2$— | —NH$_2$, HCl | [3] 190° | 70 |

[1] Acetone.
[2] Ethanol.
[3] Water.

EXAMPLE 11

2-[3-(4-benzyl-1-piperazine)propylthio]-indole dihydrochloride

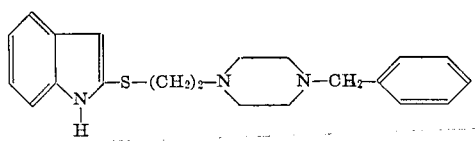

To a solution of 7.5 grams (0.05 mole) of 2-thione indoline (Sugasawa, J. Pharm. Soc. Japan, 58,29 (1938)) in 40 ml of dimethyl formamide, held under nitrogen, with agitation, is added 12.8 grams of 4-(3-chloropropyl)-1-benzyl-piperazine (BP$_{0.3}$ = 135°; J. Bourdais, Bull. Soc. Chim. (1968), 3246). The solution is warmed to 90° for 20 minutes; the basic monohydrochloride is formed quantatively.

After cooling, a sufficient quantity of hydrochloric acid in ethanol is added to the solution to form the dihydrochloride; this latter crystallizes out, and can be precipitated by the addition of ether. 22 grams of the dihydrochloride is produced (gross yield). This is recrystallized in 350 ml anhydrous ethanol in the presence of carbon of vegetable origin in 20 grams of the pure dihydrochloride is obtained (yield 91 percent) melting at 183° – 185°, with decomposition.

Example 12

2-[(4-benzyl-1-piperazino)-2-ethylthio]-indole and its dihydrochloride

A solution of 5.7 grams (0.038 mole) 2 thione indoline and 9.2 grams (0.038 mole) of 4-(2-chloroethyl)-1-benzyl-piperazine (C.C. Price, G. Kabas, I Nakata; J. med. pharm. Chem., (1955), 8, 650) in 40 ml of anhydrous isopropanol, are heated to 80°, under nitrogen, for 1 hour.

After cooling, a sufficient quantity of HCl in ethanol and anhydrous ether is added to precipitate the dihydrochloride of the said product.

14.8 grams of the product were obtained, (92 percent yield) melting point = 180°–185° (with decomposition). The corresponding base is isolated, by redissolving the dihydrochloride in 100 ml tepid water, filtering to remove insoluble matter, and treating the filtrate with CO$_3$K$_2$. The oily based formed is extracted with chloroform. After the evaporation of the chloroform, the crude product is obtained, which crystallizes out (melting point 127°). By recrystallizing in 25 ml ethyl acetate, 8.5 grams of the pure base is obtained, and melts at 132° (yield 64 percent).

EXAMPLE 13

2-(2-Diethylaminoethylthio)-3-isopropyl indole monohydrochloride

A solution of 3.82 grams (0.02 mole) isopropyl-3 indoline 2-thione, and 2.7 grams (0.02 mole) of 2-diethylamino chloroethane in 30 ml of anhydrous ethanol, is warmed to 60°, under nitrogen, for 20 minutes.

After evaporation of the solvent under vacuum, a residue, which crystallizes on contact with anhydrous ether is formed, thus 6.3 grams (97 percent yield) of the said hydrochloride is formed; melting at 163°. By recrystallization in 120 ml acetone, 5.2 grams of the pure hydrochloride are obtained (80 percent yield) melting at (164.5)°.

The 3-isopropyl indoline 2-thione used in the process of this invention is prepared thus.

First 3-isopropylidine-1-indoline-2-thione (viz formula II) is prepared, by heating a solution of 30 grams of indoline 2-thione, and 2.8 ml (0.02 mole) of trimethylamine in 100 mls of anhydrous acetone, in a reflux for 3 hours.

The product formed crystallizes at the center of the reflux, it is left to dry and after cooling, recrystalized in 120 ml of 2-methoxy ethanol.32 grams of the pure product are formed (85 percent yield), in the form of yellow crystals, melting at 230°–232° (with decomposition).

Then 9.5 grams (0.05 mole) of isopropylidene-3 indoline 2 thione, is reduced by the action of 4.75 grams (0.125 mole) os sodium borohydride in 150 ml of 95 percent ethanol. For this reaction, it is necessary to work under nitrogen, adding little by little the borohydride solution, in the space of 15 minutes. The thione solution is held at 20°. After diluting the products by 200 ml of water, the solution is acidified by 10% HCl and the 3 isopropyl indoline 2-thione (formula III) is precipitated. 9.3 grams are obtained (98 percent yield) of practically pure product. (M.P. = 134°). By recrystallizing in 40 ml of methanol, 7 grams of the pure product are obtained (i.e. 74 percent yield) as creamy colored crystals, melting at 134.5°.

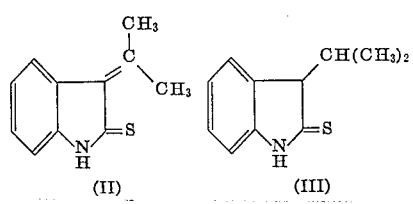

EXAMPLES 14 to 20

In like manner, the thio ethers and their hydrochlorides are prepared.

| $R_1$ | $R_2$ | $R_3$ | $-N(R_4)R_5$ | M.P., F.° (recovery solvent) | Yield, percent |
|---|---|---|---|---|---|
| H | H | $(CH_2)_3$ | -N◯N-$CH_3$, 2HCl | [1] 175-180° | 60 |
| H | H | $(CH_2)_3$ | -N◯N-⌬ | [2] 160° | 74 |
| H | H | $(CH_2)_3$ | -N◯N-⌬-$OCH_3$ | [2] 150° | 82 |
| H | H | $(CH_2)_3$ | -N◯N-⌬-Cl, HCl | [3] 218-220° | 69 |
| H | H | $(CH_2)_3$ | -N◯N-⌬(OCH_3), HCl | 200-205° | 70 |
| H | -CH(CH_3)_2 | $(CH_2)_3$ | -N◯N-$CH_3$, 2HCl | 216-218° | 92 |
| H | -CH(CH_2-CH_2 / CH_2-CH_2) | $(CH_2)_2$ | -N(C_2H_5)_2, HCl | [2] 138° | 80 |

[1] Ethanol.
[2] Acetone.
[3] Methoxyethanol.

By proceeding as described in Example 3, the following intermediate compounds may be prepared:

Cyclopentylidene-3 indoline thione-3; yellow crystals melting at 290° (with decomposition) after recystalization in methoxy-ethanol.

Cyclopentyl-3 indoline thione 3; pale yellow needles melting at 142°, after recrystallization in methanol.

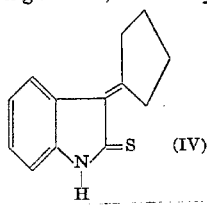   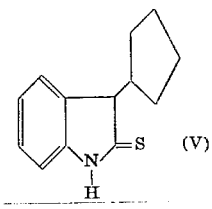

Although in the preceding examples, the final product is obtained as a hydrochloride or a dihydrochloride, the corresponding base can be prepared therefrom. For example, in the compound of Example 11, the dihydrochloride obtained is treated, according to this present example, with aqueous potassium carbonate, the product is recovered in chloroform, and the chloroform distilled off, and the oily base is obtained, which crystallizes on contact with petroleum ether; after recrystallization in cyclohexane, these crystals are obtained colorless, and melt at 59°-60°.

The hydrochloride of Example 7, has a melting point of 177° after recrystallization in methoxy-ethanol.

All the compounds produced by the process of this invention have antalgic activity in mice; adrenolytic activity in dogs, and spasmolytic activity in isolated rat duodenum.

This was exemplified in the series of tests which follow. Table I indicates the compounds used:

EXAMPLE 21

Escape Tests

Male mice weighing in the region of 25 grams are placed in lots of 4 in a plywood parallelipiped box without a cover, in which a dipping and equally inclined plane in plywood ends in a hidden wire lattice. The number of escapes by the mice are counted and compared with the control mice.

Compounds 1, 2, 4 and 5 were administered intraperitoneally at a dosage rate of 50 mg/kg body weight, the control animals received a physiological serum under the same conditions (0.5 ml/2g of body weight).

Compound 5 was most active, reducing the number of escapes by 50%, and the time for the first escape by 2.5 times. The others were less active (1, 2 and 4).

Exploration of Holes in a Board Test

A mixed sample of mice, weighing about 25 grams, are placed, on a plywood platform measuring 40 × 40 × 1.8 cm, with 16 holes of 3 cm diameter, regularly spaced, and placed on 4 legs of an upturned stool so that, for the mice, the holes have apparently no bottom.

We operate in the absense of any shrill noise and at a constant temperature. The treated mice are placed in the center of the floor and the number of holes explored in 5 minutes is counted and compared with the results obtained with the control mice under the same conditions. The activity of 1, 2, 4 and 5 are all the same, the reduction in curiosity is 48 – 57 percent.

Lengthening of Sleep when the Compounds are used with Sodium Hexobarbital

This test, done on female mice, used a hypnotic (60 mg/kg.), sodium hexobarbital administered intraperitoneally.

| Compound Number | Example Number | $R_1$ | $R_2$ | $R_3-N(R_4)R_5$ |
|---|---|---|---|---|
| 1 | 3 | H | H | $(CH_2)_2N(C_2H_5)_2 \cdot HCl$ |
| 2 | 4 | H | H | $(CH_2)_2N(C_3H_7)_2 \cdot HCl$ |
| 3 | 6 | H | H | $(CH_2)_3N(CH_3)_2 \cdot HCl$ |
| 4 | 14 | H | H | $(CH_2)_3-N◯N-CH_3 \cdot 2HCl$ |
| 5 | 11 | H | H | $(CH_2)_3-N◯N-CH_2-⌬ \cdot 2HCl$ |

The mice are tested 5 days in advance with sodium hexcobarbital alone to eliminate animals that are too susceptible and to obtain a homogenous sample.

For the experiment the mice were treated with compounds 1 and 4, with an intraperitoneal dose of 50 mg/kg.

The control received 0.5 ml of distilled water. The duration of the induced sleep is determined for each group (treated and untreated).

The experiment showed had the effect of increasing the barbiturate sleep by 3 times.

Protection Against Amphetamine Toxicity.

A dose of 25 mg/kg of dexamphetamine administered intraperitoneally to a group of mice resulted in 100 percent death at the end of 2 and 4 hours if the mice were in a group and no mortality if the mice were isolated, a suppressive agent was sort, so that when said product was administered subsequently this hypertoxicity of the amphetaine on the groups of mice disappeared. The products studied here were 1 2 3 and 5, at 50 mg/kg body weight, by intraperitoneal injection.

The control substance was a neuroleptic, a chlorpromazine which, when injected into the buccal cavity, protects 100 percent of the mice from amphetamine hypersensitivity.

The action of the products varied, according to the substitution of the compound radicals.

However, compounds 1 and 2 showed no protective action, and compounds 3 and 5 gave a weak protective action.

Protection Against Emotional Stress

Isolated mice in glass cages, 3 per cage were plunged into darkness for 10 minutes. The effects of the change in environment having worn off, the number of faeces produced in 5 minutes is counted, during a stress situation.

Thus one group of 30 control mice were kept dark and the other group of 30 mice were given a light stimulation. The number of faeces produced by the mice exposed to the light is taken as a measure of the emotional stress of the mice.

The intensity of modifications in emotional response to light of animals treated 1 hour previously was studied, using compounds 1, 2, and 5 at 50 mg/kg body weight by intraperitoneal injection and the number of reduced defaecations is calculated as a percentage.

The control tranquillizing substances used where Diazepam 10 mg/kg and Meprobamate 300 mg/kg by the buccal cavity.

The compounds 1, 2 and 5 where used and shown to have excellent protective qualities, completely removing the extra defaecations.

Apart from protection from effects on the central nervous system (CNS) the other organic systems were equally tested.

Action on the Involuntary Nervous System

The carotid pressure was measured with a Ludwig manometer on a dog anaesthetized with chloralose (10 cg/kg) and the depth and rhythm of respiration measured by the Paul Bert pneumograph, utilizing a Marey capsule.

Compounds 1, 4 and 5 were injected into the external saphenic vein in doses up to 50 mg/kg. The same experiments were done on a rat anaesthetized with ethyl carbonate (1.25 g/kg) and on which the compounds 1, 2, 4 and 5 were administered by intravenous injection, at the rate of (50 mg/kg).

Under these conditions the vascular reactivity to adrenalin, noradrenalin, Neosynephrine and Acetyl choline were studied.

Compounds, 1 and 4 significantly reduced the adrenalin hypertension in the dog — however compound 5 acted synergistically with the adrenalin, whereas it caused a return to normal when used for hypertension caused by neosynephrine.

Test on Isolated Rat Duodenum

The activity on the intestine was studied on an isolated rat duodenum according to the classic Magnus method. The isolated intestine was placed alive in oxygenated Tyrode bath.

The action of compounds 1, 2 and 5 where studied on the non contracted intestine, and then on the intestine contracted by Barium-chloride and Acetylcholine.

The contraction caused by the Barium salt is inhibited by a concentration of $1 \times 10^{-6}$ of compounds 1, 2, and 5.

Analgesic Action

By the use of the Janssen test with rats of both sexes, weighing about 200 grams, when the tail is placed in a container of water at 55°. The time the animal takes to register a reaction to the thermal stimulus is studied by the time the animal takes to remove his tail.

Compound 3 was the only one studied at an interperitoneal dose of 50 mg/kg.

The rat receiving the compound 3 took 25 percent longer to remove his tail.

Antalgic Action

Here the Syndrome caused by the injection of interperitoneal phenylbenzoquinone was studied, using mice.

(0.5 ml of a 0.22 percent aqueous solution in 5 percent ethyl alcohol).

The number of sad cries are recorded between the 5th and the 20th minute following the injection with phenylbenzoquinone, and this number compared with those of the control mice.

The compounds 1,2, 3 and 5 where studied at a dosage rate of 50 mg/kg by intraperitoneal injection.

The control substance was 300 mg/kg of acetyl salicylic acid via the buccal cavity.

Compound 5 was good at relieving the syndrome but 1, 2 and 3 were excellent.

Action of Compounds with Histamines

Action on the histamic bronchospasms was studied on guinea pigs subjected to an aerosol of histamine (0.4 percent solution) the animals were pretreated with compounds 1, 2, 4 and 5 at 50 mg/kg body weight, intraperitoneally. Compounds 1, 2, and 4 gave quite good protection against spasms, but compound 5 was best.

Choleretic Activity in a Dog

On a fasting dog, we used the classic method of improvized biliary fistula. The animal was anaesthetized with Chloralose (10 cg/kg intravenously) and the bilary duct blocked by a ligature of the cystic canal. The volume of bile, recorded in a graduated flask, is measured every quarter of an hour before and after the administration of the product, until the bile levels return to the initial levels The products were injected into the external saphenic vein, compounds 2 and 4 at 25 mg/kg, and, 1 and 5, at 50 mg/kg.

The choleretic activity of the dog was increased by 100 percent with compounds 2 and 4.

Lethal Dose

The toxic threshold is considered to be the dose at which 50 percent of the treated animals die.

The DL. 50, is calculated by the Behrens and Kerber method at the end of 24 hours.

for Compound 5   172 mg/kg intraperitoneally
for Compound 1   274 mg/kg intraperitoneally A new series of experiments is required to confirm these findings.

Where

+ = some activity
++ = good activity
+++ = Excellent activity
0 = negative activity.

| Tests | 1 | 2 | 3 | 4 | 5 |
|---|---|---|---|---|---|
| Flight or escape of mice from a box (reduction of the number of flights during 5 minutes as compared to control mice after treatment with compound) | + | + | | + | ++ |
| Exploration of holes in a board by mice (reduction of curiosity after treatment with compound) | + | + | | + | + |
| Lengthening of sleep period caused by compound after administration of hypnotic substance (sodium hexobarbital) | ++ | | | ++ | |
| Protection against amphetamine toxicity | 0 | 0 | + | | |
| Protection against emotional stress | +++ | +++ | | | +++ |
| Action on isolated rat duodenum | ++ | ++ | | | ++ |
| Analgesic action in mice (tail dipped in hot water) | | | + | | |
| Antalgic action in mice (having received phenylbenzoquinone intraperitoneally) | +++ | +++ | +++ | | ++ |
| Protection against histaminic broncho spasm in mice | | | | | + |
| Choleritic activity in dog | | ++ | | ++ | |

I claim
1. A compound of the formula

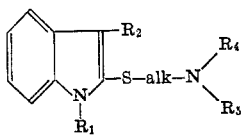

wherein $R_1$ and $R_2$ are each independently selected from the group consisting of hydrogen, lower alkyl, and cyclopentyl; alk is alkylene of 2 to 5 carbon atoms; $R_4$ and $R_5$ are each independently hydrogen or lower alkyl or —$NR_4R_5$ is

wherein $R_6$ is methyl, phenyl, benzyl, chlorophenyl, methylphenyl or methoxyphenyl, and the nontoxic acid addition salts thereof, salified at the group —$NR_4R_5$.

2. A compound of claim 1 wherein
$R_1$ is hydrogen or methyl;
$R_2$ is hydrogen, iso-propyl or cyclopentyl; and
alk is ethylene or propylene 3. A compound of claim 2 wherein each of $R_4$ and $R_5$ is hydrogen or lower alkyl.

4. A compound of claim 3 wherein said lower alkyl group is methyl, ethyl or iso-propyl.

5. A compound of claim 2 wherein —$NR_4R_5$ is a heterocyclic group of the formula

6. A compound of claim 23, wherein —$NR_4R_5$ is a group of the formula

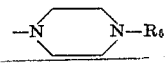

7. A compound of claim 2, wherein $R_1$ and $R_2$ are hydrogen.

8. A compound of claim 7 wherein $R_4$ and $R_5$ are both methyl or isopropyl; or —$NR_4R_5$ is

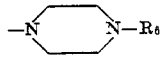

wherein $R_6$ is methyl or benzyl.

9. The compound of claim 8 wherein alk is ethylene and —$NR_4R_5$ is dimethylamino and the hydrochloride thereof.

10. The compound of claim 8 wherein alk is ethylene and $NR_4R_5$ is di-isopropylamino and the hydrochloride thereof.

11. The compound of claim 8 wherein alk is propylene and —$NR_4R_5$ is dimethylamino and the hydrochloride thereof.

12. The compound of claim 8 wherein alk is propylene and —$NR_4R_5$ is

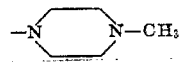

and the dihydrochloride hereof.

13. The compound of claim 8 wherein alk is propylene and —$NR_4R_5$ is

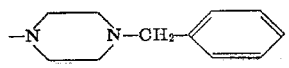

and the dihydrochloride thereof.

14. The compound of claim 8 wherein alk is ethylene and —$NR_4R_5$ is

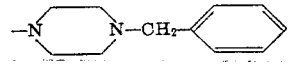

and the dihydrochloride thereof.

15. An indole of claim 1 which is a hydrochloride.

* * * * *